US00RE37519E

(19) United States
(12) Reissued Patent
Densberger et al.

(10) Patent Number: US RE37,519 E
(45) Date of Reissued Patent: Jan. 22, 2002

(54) GOLF CLUB WITH OPTICAL ALIGNMENT SYSTEM

(76) Inventors: John Ashley Densberger, 5456 Delia Way, Livermore, CA (US) 94550; Derek Edward Decker, 835 Discovery Bay Blvd., Discovery Bay, CA (US) 94561

(21) Appl. No.: 09/338,684

(22) Filed: Jun. 23, 1999

Related U.S. Patent Documents

Reissue of:
(64) Patent No.: 5,640,777
Issued: Jun. 24, 1997
Appl. No.: 08/489,546
Filed: Jun. 12, 1995

(51) Int. Cl.[7] ..... A63B 53/04; G01C 15/00
(52) U.S. Cl. ..... 33/263; 33/289; 473/240
(58) Field of Search ..... 33/263, 276, 277, 33/286, 289, 508; 473/219, 220, 226, 231, 238, 240, 242, 251

(56) References Cited

U.S. PATENT DOCUMENTS 2,822,614 A * 2/1958 Susinno ..... 33/263
2,929,631 A * 3/1960 Gillon ..... 473/240
3,019,022 A * 1/1962 Ehmke ..... 33/263
3,043,596 A * 7/1962 Ehmke ..... 473/240
D233,535 S * 11/1974 Karban ..... 473/240
4,367,877 A * 1/1983 Gibson et al. ..... 473/240
5,640,777 A * 6/1997 Densberger et al. ..... 33/263

* cited by examiner

*Primary Examiner*—Christopher W. Fulton
(74) *Attorney, Agent, or Firm*—Buckley, Maschoff, Talwalkar & Allison LLC

(57) ABSTRACT

An alignment system and method of use provide significant improvement in the accuracy of a golf stroke or putt. The alignment system may be incorporated into or attached to the head or shaft of a golf club such as a putter or a chipper. One component of the alignment system is a sighting alignment system which includes a turning mirror that is attached to the club head or shaft or may be integral to the top or rear portion of the golf club head. While viewing the reflection of the ball and target through the mirror, the golfer obtains visual feed-back that is very sensitive to club positioning and aiming. The other component is another optical alignment system in which parallax is removed to put the golfer's eye in the proper plane to assure alignment over the golf club head. When both alignments are maintained in the reflected image during the golfer's stroke, the accuracy of the stroke is dramatically improved.

15 Claims, 8 Drawing Sheets

GOLF CLUB WITH OPTICAL ALIGNMENT SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the game of golf, and more specifically, it relates to an alignment system for a golf club which improves accuracy.

2. Description of Related Art

A golf course generally has 18 holes spread over a landscaped area that customarily includes a number of hazards—water, rough, sand traps (also known as bunkers), and trees—that are designed to make the game more difficult. Difficulty is also increased by the varying distances among holes. Play on each hole is begun at the tee area, from which players "tee off" and "drive" the ball into the fairway or onto the green. At the end of the hole—which can vary in length from about 100 to 600 yards is the putting green, which surrounds the actual hole, or "cup," into which the ball must be putted in order to complete the hole. Saint Andrews in Scotland, Augusta National in Georgia (site of the annual Masters tournament), and Pebble Beach in California. have some of the most famous and difficult courses.

In the putting segment of the game of golf, the objective is to direct the golf ball across the putting green until it comes to rest in the hole or cup. The putting green is a smooth and closely cut grassy area surrounding the hole. An accurately hit golf ball will travel along a path to the hole. In the case where the path between the ball and hole contains a slope to one side or the other, the golfer will try to determine the proper target direction which will allow the ball (once struck) to follow a curved path to the hole.

Although the putting green is usually conditioned to provide an optimum surface over which to putt, the inability to properly aim the ball is a golfer's major shortcoming. When putting, it is very important that the face of the putter be placed exactly at a right angle in line to the target direction at the moment when the putter impacts the ball. Alignment of the putter adjacent to the ball in this manner is difficult when the ball rests even a short distance from the hole, since the golfer is usually unable to see the ball, club head and target simultaneously. This problem also exists when using any type of golf club.

In general, a golfer attempts to ensure that club head alignment and motion are co-linear with the intended direction at the exact point of impact with the ball. A number of patents have attempted to provide improvements in a golf club that would help a golfer ensure similar co-linearity of club head alignment and motion.

U.S. Pat. No. 3,421,765 is directed to a golf dub including a sighting mirror for aligning the face of the golf club with a golf ball and the flag stick used on the putting green of a golf coarse. Accordingly, the invention comprises a putter that enables the golfer to view the putter, golf ball, and a hole or flagstick simultaneously. The invention includes a mirror or other reflective surface, attached to the head of the golf club in such a manner that, when the player places the club in position to putt the golf ball, the mirror will reflect an image of any object in the area in front of the face of the golf club, both horizontally and vertically in front of the face of the golf club so that the object can be seen by the golfer in his normal stance above the golf club. The patent can present erroneous feedback to the golfer, due to the lack of an effective means for a alignment between the putter head and the golfer's eye.

U.S. Pat. No. 3,507,500 is directed to a putter which includes a mirror attachment that enables a golfer to view the putter, a golf ball and a hole or flag stick simultaneously. The invention includes a mirror or other reflective surface, attached to the head of the putter in such a manner that, when the player places the putter in position to putt the golf ball, the mirror will reflect an image of any object in the area in front of the face of the putter. It is an object of this invention to provide an apparatus for positioning the face of the head of a golf club so that its vertical and lateral axes are disposed exactly at right angles to the direction a golf ball must travel to enter the hole of a putting green. In this patent also, there is no effective means for alignment between the putter head and the golfer's eye. This can lead to erroneous feedback to the golfer. It is apparent from the figures that both patents discussed above add mass unbalance about the center of the putter face which undesirably moves the "sweet spot" associated with that putter.

U.S. Pat. No. 5,195,749 is directed to a golf club head which includes a front face with a negative inclination; a middle section inclined about 45° and a section which acts as a mirror with a view to lining up the stroke. A first object of the patent is to prevent the ball from being sliced or hooked. A second object of the patent is to obtain a suitable line in order to aim the club with complete independence of the position and stance of the player. This patent shows the same lack of alignment (from putter head to the golfer's eye), as evidenced in U.S. Pat. No. 3,421,765 and U.S. Pat. No. 3,507,500, which provides erroneous feedback to the golfer.

U.S. Pat. No. 4,601,472 is a sighting device for a putter and includes an eye aligning mirror having a horizontal reflective surface and a ball and target aligning mirror. The device is used for aligning the putting face of the blade square to a target path between a ball and target while aligning the eye of the player over the putter club head. The stated object of the patent is to provide a sighting device which may be attached to the blade of some types of putters without having to modify the putter blade so that the same putter may be used by a player in both practice and play under the rules of golf. The player shows a limited means for alignment of the golfer's eye to the putter head, which is required for reliable feedback about the putter face. The mechanism used (a mirror laying flat on top of the putter so the golfer may see his eye in the reflection) fails in five important ways. First, this increases the likelihood of seeing the sun reflected in this mirror which poses an optical hazard of temporary blindness or after images that impair vision. Second, the putter head will tilt out of alignment to the golfer's eye during a swing except in the extremely unlikely event where the swing is on a circular arc centered on the golfer's eye. Third, the design is limited to a given style or type of putter head. Fourth, the putter head striking surface is reduced to approximately twenty-five percent of the original putter head striking surface. Fifth, due to the small size of the mirror and its distance to the eye, the golfer may get confused about which eye sees which, e.g., right seeing right, right seeing left and right seeing left while simultaneously left seeing right.

It is desirable that a golf club include the advantage of a type of visual feedback to the golfer which would ensure that the alignment of the club head be co-linear with the intended direction at the point of impact. It is also desirable to provide a golf club that includes a means for insuring that the position of the club head with respect to the golfer's view, remains within a prescribed plane, both before and during the putting stroke. It would also be beneficial if the alignment of the golf club to the intended target included a means for on-axis viewing of the golf ball and target in a properly balanced club. Additionally, it would be helpful if the golf club include visual feedback to assist and verify a straight swing of the club head in the plane that includes the intended target direction. The present invention provides these and other advantages and benefits.

SUMMARY OF THE INVENTION

It is an object of the present invention to provide an alignment system for a golf club which significantly improves putting accuracy.

It is another object of the invention to provide a golf club with an alignment system which significantly improves the club head alignment for the golfer.

It is a further object of the present invention to provide an apparatus which can be used to improve swing accuracy.

Still another object of the invention is to provide a method for significantly improving alignment of a golf club swing.

The invention is a compound alignment system which may be attached to the club or incorporated directly into the head of a golf club. The compound alignment system is comprises of two independent alignment systems which may share common pars such as a turning mirror. The first alignment system will be called the parallax correction alignment system because it uses a system to remove visual parallax to properly align the golfer's eye over the club head. The second alignment system will be termed the sighting alignment system because the golfer sets his sights on his target while looking into the turning mirror. When used together, these alignment systems allow the golfer to line up a stroke, such as a putt, much more accurately than would be possible without this visual feedback.

In one example, a putter head has a forward striking face for impacting the ball, and would have a rear upper portion which holds a reflecting surface that is angled to present a view of the golf ball and the target upon sighting alignment. The mirror usually has a protective glass or plastic layer above the reflecting surface. This transparent spacer with a thin line (co-planar with the surface normal of the striking face) painted on the top surface constitutes an embodiment of the parallax correction alignment system. A reflection of the line is visible from the reflective surface. For proper parallax correction alignment, the line on the top of the transparent spacer obscures the reflected line in the golfer's view. While maintaining parallax correction alignment, the club head is translated until the golf ball is aligned evenly about the overlaid lines to center the ball on the striking face and then sight the target in the reflection viewed by the golfer. When this alignment is maintained during the golfer's stroke, the directional accuracy is improved dramatically.

An advantage of this invention over existing putters and other golf clubs is the elimination or reduction of initial set-up error. Trial and error experimentation to interpret or adjust for the off-axis view is eliminated. The player's confidence will ultimately be improved through the reduction in alignment uncertainty caused by improper or questionable set-up. Additionally, proper swing motion and the development of correct muscle memory for consistent golf strokes is possible when the alignment described above is done in two or more locations such as near the ball and when the putter head is a foot or more distance from the ball before it is struck. Muscle memory is reinforced by observing that one can swing back and return to the ball and still be aligned. Accuracy gain is a welcome form of feedback that gives confidence to any golfer.

Set-up error is eliminated or reduced through the iterative alignment procedure which is visual and easy to learn. The procedure first utilizes the parallax correction alignment system to ensure accurate positioning of the golfer's eye relative to the club head. Next, the sighting alignment system provides an on-axis view for club head, ball and target alignment. Hence, the article is a new training aid, as well as a club that could be used during an actual golf game.

DETAILED DESCRIPTION OF THE INVENTION

Figure 1:
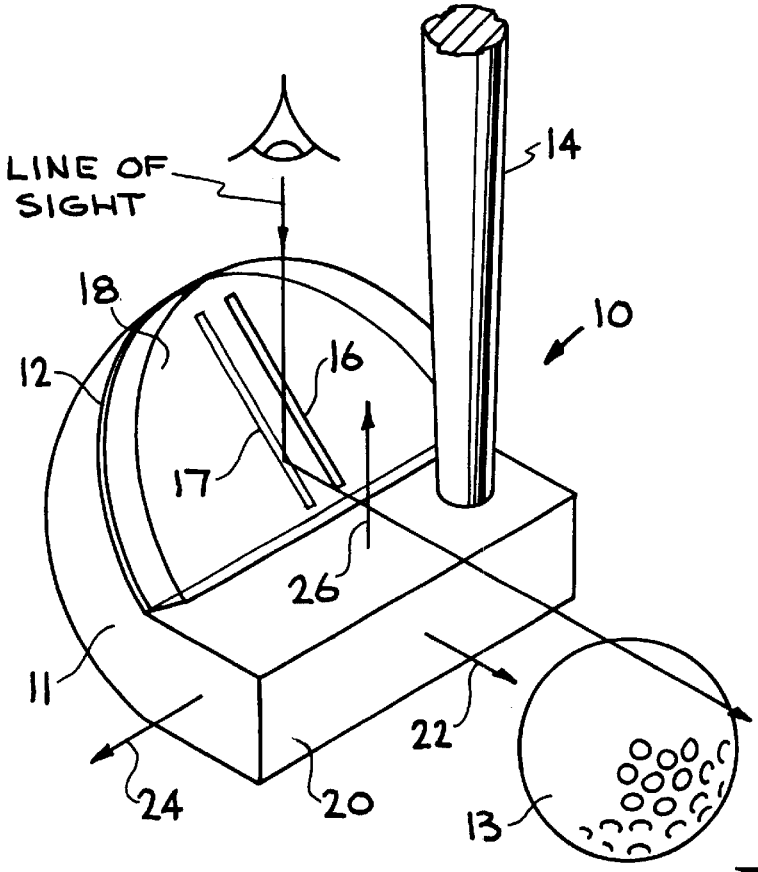
FIG. 1 is a perspective view of a putter head of one embodiment of the present invention.

The invention is generally a method and apparatus for aligning an object in a desired direction, and includes a parallax correction alignment system having means for defining a plane where parallax has been eliminated. Parallax is an apparent change in the direction of an object, caused by a change in observational position that provides a new line of sight. The invention also includes a sighting alignment system having reflecting means which include a surface normal located in the plane described above. The apparatus may be integral with the object or it may be a modular unit that is attachable to the object. These general elements are shown in the specific embodiments of a putter and a chipper shown in the accompanying figures. The sighting alignment system may use optical elements such as lenses and holograms to alter the image of the target direction viewed with the reflecting means. The image plane of the target direction may be moved to another location such as infinity (where it is easiest for most people to focus) or closer in so the image coincides with the image plane used in the parallax correction alignment system. The image size of the target may be changed to adjust the sensitivity of image motion with respect to alignments (such as twisting the club head about a vertical axis through its center of mass). The reflecting means may include a reflective lens such that it has optical power and can be used to adjust target image size and/or image plane location FIG. 1 shows a perspective view of putter head 10 with rear portion 11 which is upwardly angled at about 45° and has a reflective surface 12 attached to the top thereof. A transparent spacer layer 18 is either attached to the top of reflective surface 12 or the reflective coating 12 is applied to the bottom of the transparent spacer layer 18. One embodiment of a parallax correction alignment system comprises a solid, dot, dashed or patterned line 16 incorporated on or embedded into the transparent spacer layer 18 in such a way that it is co-planar with the surface normal of the striking face 20. Let the surface normal be defined as a line passing through the center of the striking face 20 and being perpendicular to a planar striking face 20, or at least horizontally perpendicular to a curved or tilted striking face 20. Forward axis 22 illustrates such a surface normal. Horizontal axis 24 and vertical axis 26 are also shown. Line 16 may have a top color that is different from a bottom color to discriminate reflected line 17 from the top line 16, to ensure that the user's eye to the club head is in the proper plane, as the user holds shaft 14 in the normal putting stance. While holding the putter in the normal putting position, line 16 is aligned when viewed to be co-planar with reflected line 17, through golf ball 13 and to the target (not shown).

Figure 2:
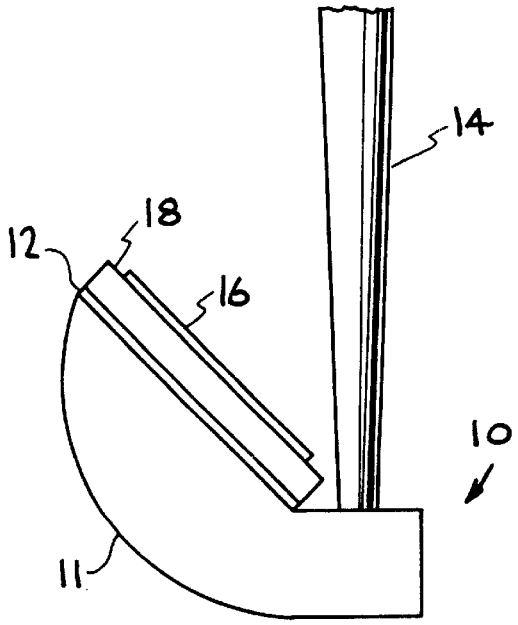
FIG. 2 is a side view of the putter head of FIG. 1.

FIG. 2 shows a side view of the putter of FIG. 1. Upwardly angled rear portion 11 of putter head 10 has reflective surface 12 attached thereto. Transparent spacer 18 is attached to the top of reflective surface 12. Line 16 is attached to the top of or embedded into transparent spacer layer 18. Shaft 14 upwardly extends from a portion of the putter head 10. Reflective mirror surface 12 and transparent spacer layer 18 angle above a hitting surface (about 45°) so as to allow the user to sight down through line 16 and 17, and ball 13 to the intended target.

Figure 3:
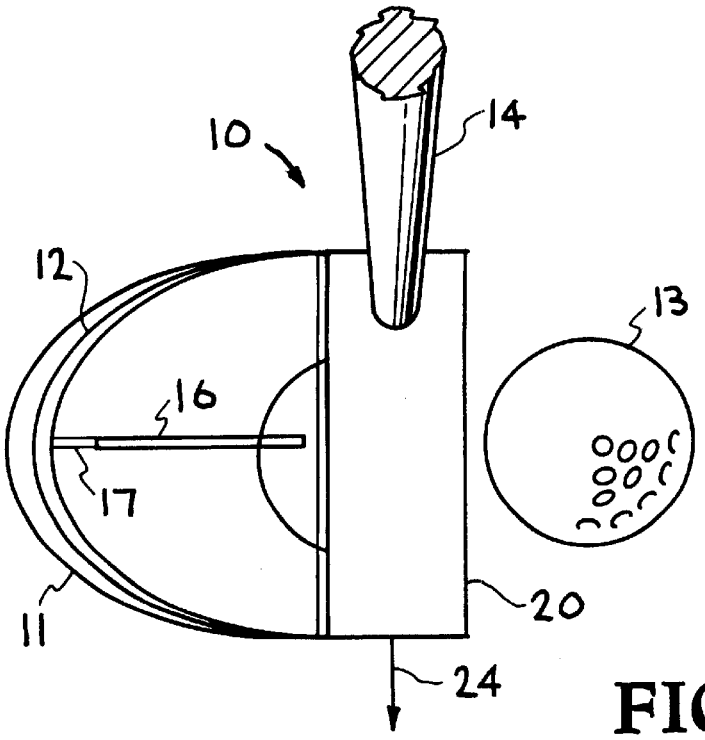
FIG. 3 is a is a top view of the putter head of FIG. 1.
Figure 4:
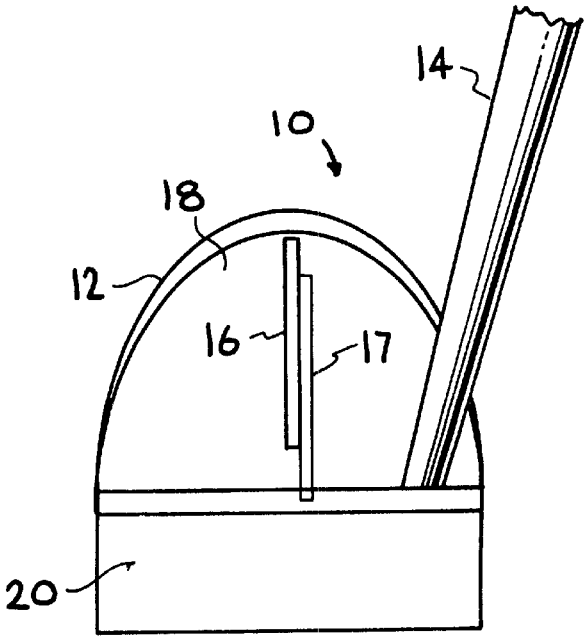
FIG. 4 is a front view of the putter head of FIG. 1.

FIG. 3 is a top view of putter head 10, reflective surface 12, spacer 18, club face 20, golf ball 13 and shaft 14. The parallax correction alignment system comprises line 16 and reflected line 17 and a transparent space between them. This is approximately the view as seen by a player in the normal putting stance. The reflection of golf ball 13 is shown in the reflective surface 12. A target, such as a flag stick in a hole on the putting green, is not illustrated in reflective surface 12. The overlap of lines 16 and 17 show parallax correction alignment is obtained but the putter head 10 should be translated along horizontal axis 24 to better center the golf ball 13 on the striking face 20 as shown by lines 16 and 17 not equally dividing the image of golf ball 13 in the reflective surface 12. FIG. 4 shows a front view of putter head 10, reflective surface 12, spacer 18, club face 20 and shaft 14. The parallax correction alignment system comprises line 16 and reflected line 17 and a transparent space between them. FIG. 4 shows the reflected line 17 is slightly out of alignment with line 16.

Figure 5:
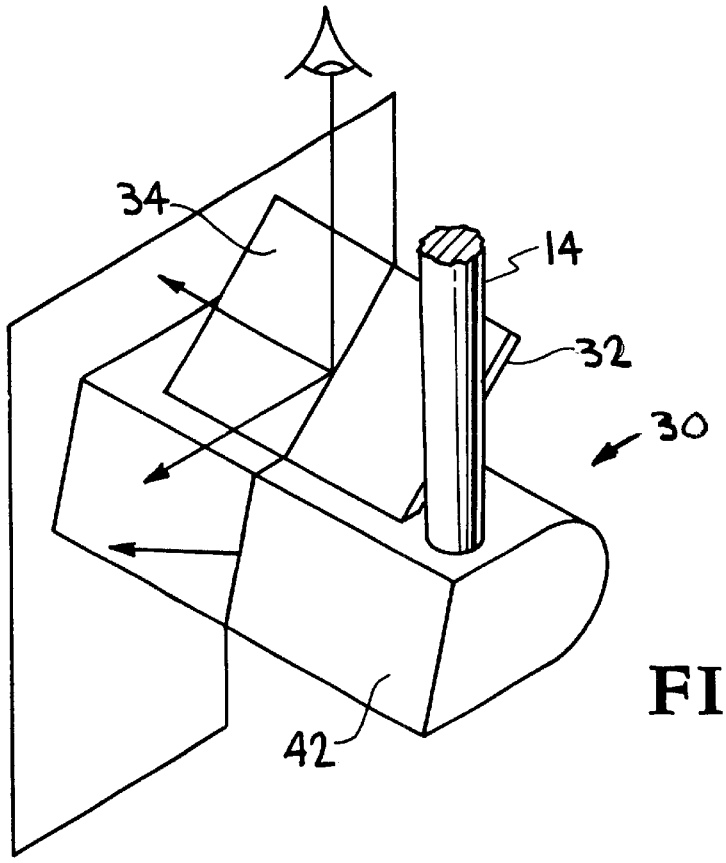
FIG. 5 shows a perspective view of a chipper head of the present invention.
Figure 6:
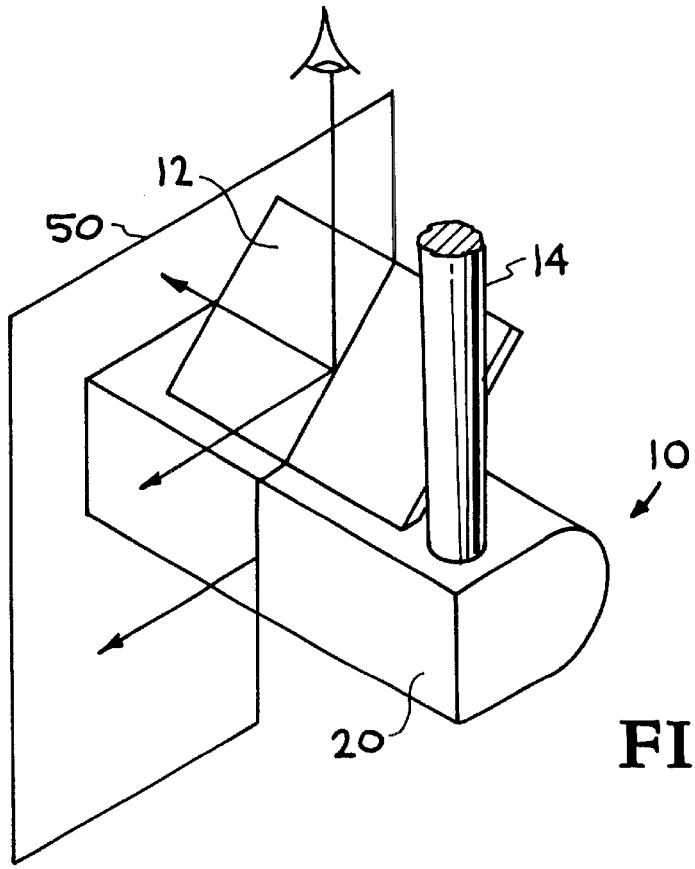
FIG. 6 shows the plane defined by the parallax correction alignment system.

A chipper is a type of golf club used generally off the putting green to provide loft with a putt-like stroke to carry the ball over higher cut grass to the green so the ball may roll with accuracy similar to a putt. FIG. 5 shows a perspective view of a chipper head 30 with an upwardly angled portion 32, and a reflective surface 34 attached thereto. The transparent spacer layer 18 and parallax alignment system comprising line 16 and reflected line 17 are not shown. Club head 30 has a club face 42 which is formed at an angle with respect to the vertical plane. Club face 42 can be formed at an angle within a range, as known in the art, depending on the distance and loft required. FIG. 6 shows a perspective view of a putter head 10 having a putter face 20, shaft 14 and reflective surface 12. Spacer layer 18 and lines 16 and 17 are not shown in this figure. When line 16 overlaps line 17, the parallax correction alignment system is aligned and plane 50 is established.

Figure 7:
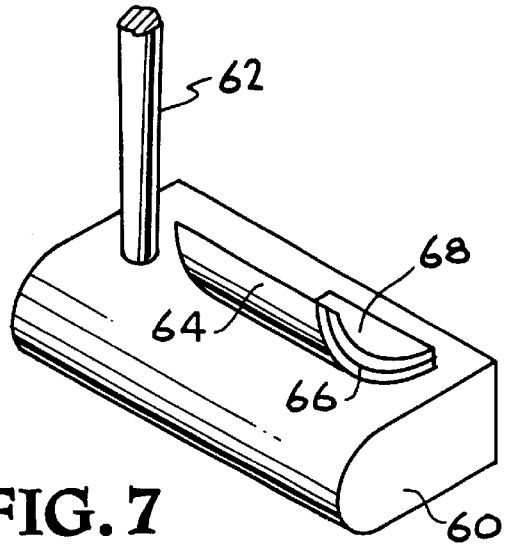
FIG. 7 is a golf club with a concave mirror section.

The sighting alignment system may use optical elements such as lenses and holograms to alter the image of the target direction viewed with the reflecting means. A hologram that has a very narrow viewing angle may be used as a parallax correction system. In FIG. 6, reflective surface 12 may be replaced with a hologram. The image size of the target direction may be moved to another location such as infinity (where it is easiest for most people to focus) or closer in so the image coincides with the image plane used in the parallax correction alignment system. The image size of the target may be changed to adjust the sensitivity of image motion with respect to alignments (such as twisting the club head about a vertical axis through its center of mass). The hologram may project shapes to an image plane. The reflecting means may include a reflective lens, as shown in FIG. 7, such that it has optical power and can be used to adjust target image size and/or image plane location. FIG. 7 shows a putter head 60 having a shaft 62 and a curved portion 64 with a reflective surface 66 attached thereto. A transparent spacer layer 68 with a parallax correction alignment system is attached to the top of reflective surface 66.

As indicated in FIGS. 1–4, the parallax correction alignment system may include a first line and a second line, where the first and second lines are located in the plane defined by the surface normal of the turning mirror and the horizontal component of the surface normal of the striking face of the golf club. The first line is then located between a user's view and the second line, where the first and second lines are separated along an optical axis extending from the user's view to the second line. The parallax correction alignment system is properly aligned when the first and second lines overlap in the user's view in the defined plane. The second line may simply be a reflection of the first line in the turning mirror if the first line extends across the mirror separated by a small distance. The reflected second line may be seen when the user's view is out of the defined plane.

Figure 8:
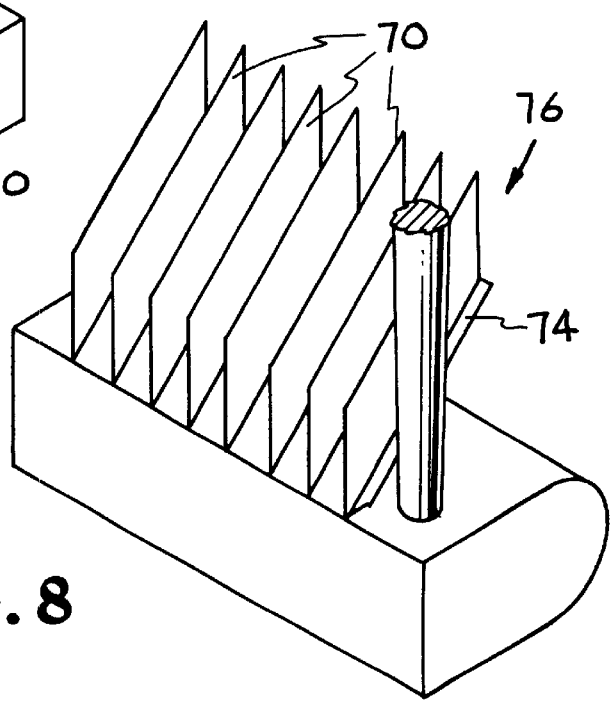
FIG. 8 is a putter with thin fins.
Figure 9:
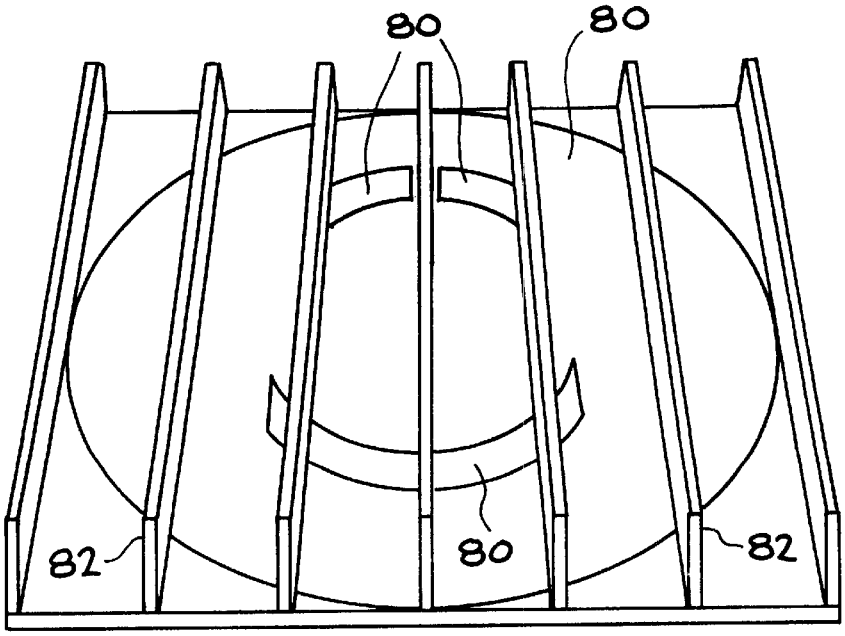
FIG. 9 shows a second embodiment of thin fins where shapes come into view with correct alignment.
Figure 10:
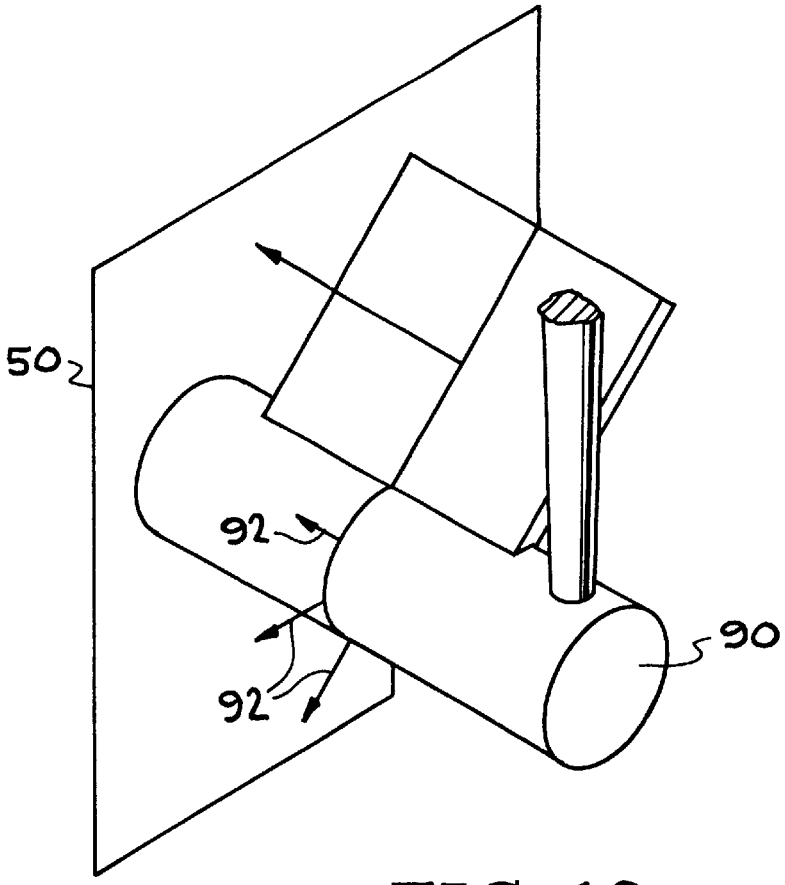
FIG. 10 shows a cylindrical putter head.

In FIG. 8, the parallax correction alignment system includes thin fins 70 attached to the top of reflective surface 74 of putter 76. Thin fins 70 are configured to be parallel to the defined plane, as shown in FIG. 6, to obscure the user's view from the sighting alignment system when the user's view is out of the defined plane. The thin fins 70 are optimally spaced at no greater than 2 mm apart, are located above the reflective surface 74 and are embedded in a thin sheet of optically clear material (not shown). FIG. 9 shows another embodiment where shapes 80 obscured by fins 82 come into view when the parallax correction alignment system is aligned. FIG. 10 depicts an embodiment of the parallax correction alignment system which includes a cylindrical reflector 90 (continuous or segmented) having surface normals 92 that are co-planar with the plane 50 defined by the parallax correction alignment system, where the user's view includes a view of the user's eye in the defined plane.

Figure 11A:
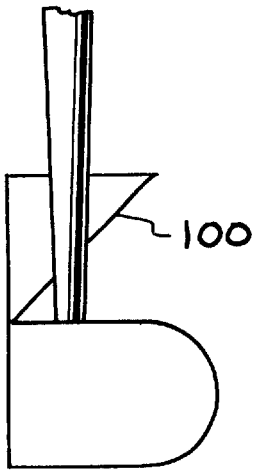
FIG. 11A shows a side view of a putter with a right prism.
Figure 11B:
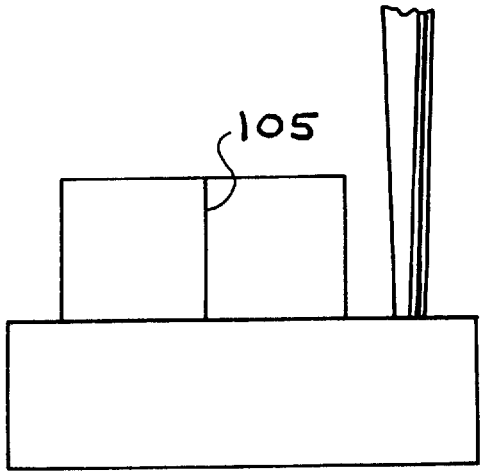
FIG. 11B shows a front view of the putter of FIG. 11A.
Figure 11C:
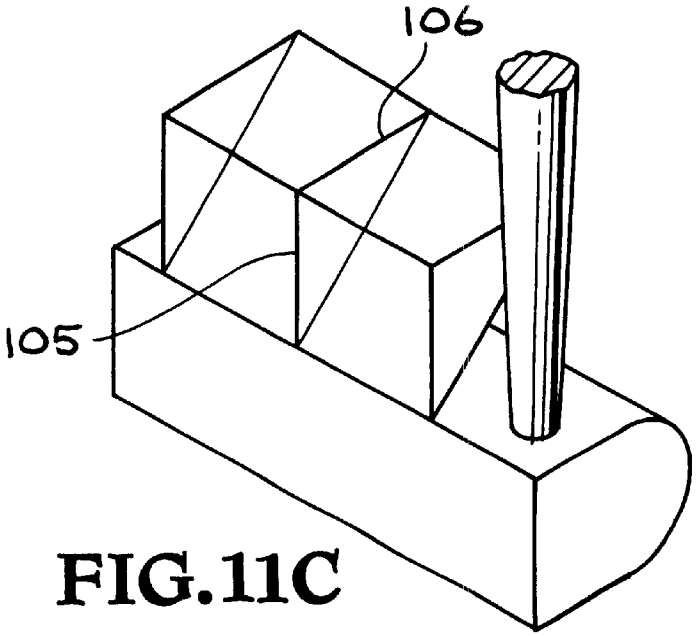
FIG. 11C shows a perspective view of the putter of FIG. 11A.

FIG. 11A shows an embodiment of the invention where the reflecting means may include internal reflection off the largest rectangular face 100 of a right prism (45°—45°–90°), where the first and second lines are on the perpendicular rectangular faces of the right prism. FIG. 11B shows the overlap of first line 105 and second line 106. FIG. 11C shows a perspective view of the putter of FIG. 11A. The first and second lines are then located in a plane defined by the surface normals of the right prism and the horizontal component of the surface normal of the striking face of the golf club.

Figure 12:
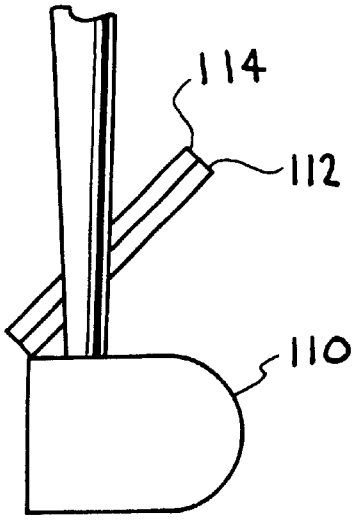
FIG. 12 is a side view of a putter with a mechanical or liquid crystal shutter.

Another embodiment of the invention, shown in FIG. 12, includes means for momentarily blocking the sighting alignment system. Putter or chipper striking head 110 has a parallax correction alignment system 112 attached thereto. A mechanical shutter 114 or an electronically controlled liquid crystal light valve with no moving parts 114 may be used for this purpose. The liquid crystals may be designed to change from transparent to translucent (scattering light to obscure the view) or transparent to opaque (absorbing light with the help of polarizers to attenuate the view).

Figure 13:
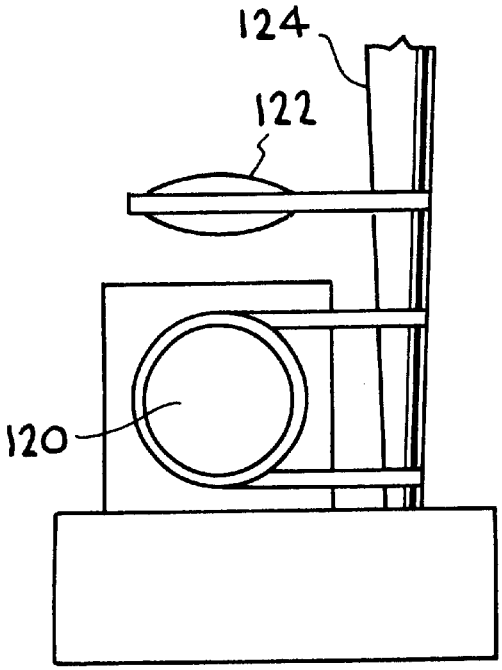
FIG. 13 shows an embodiment of the present invention having two positive lenses attached to a shaft.
Figure 14:
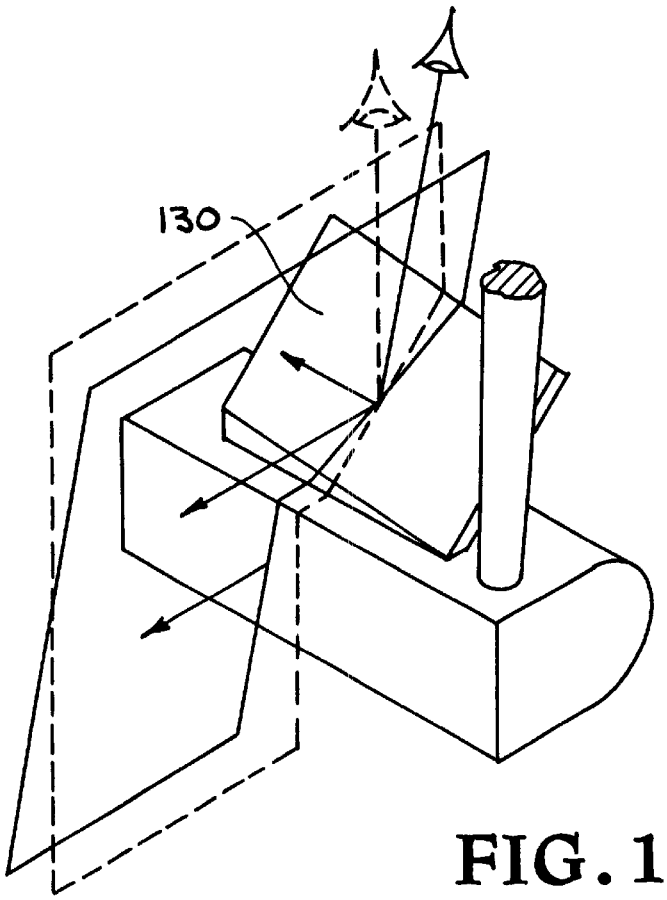
FIG. 14 is a golf club with an adjustable reflective surface.

FIG. 13 shows an embodiment of the present invention having lenses 120 and 122 attached to shaft 124. These lenses may be telescopically adjusted to alter the view of the intended target or direction. In FIG. 14, mirror 130 may tilted to compensate for the differences in putting stance taken by individual players.

Figure 15A:
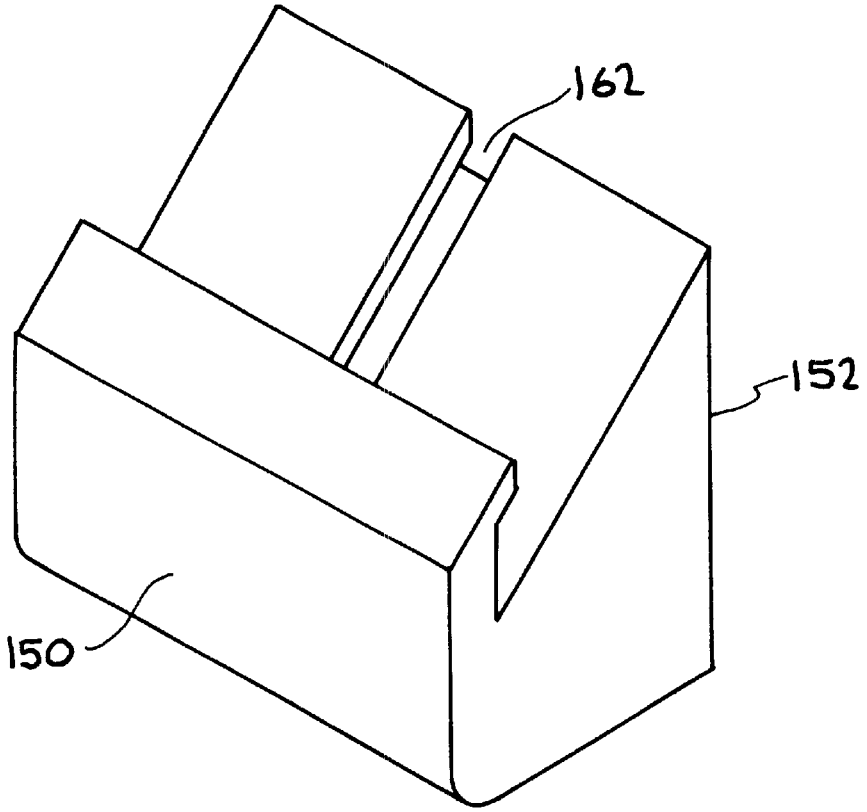
FIG. 15A is a modular embodiment of the invention.
Figure 15B:
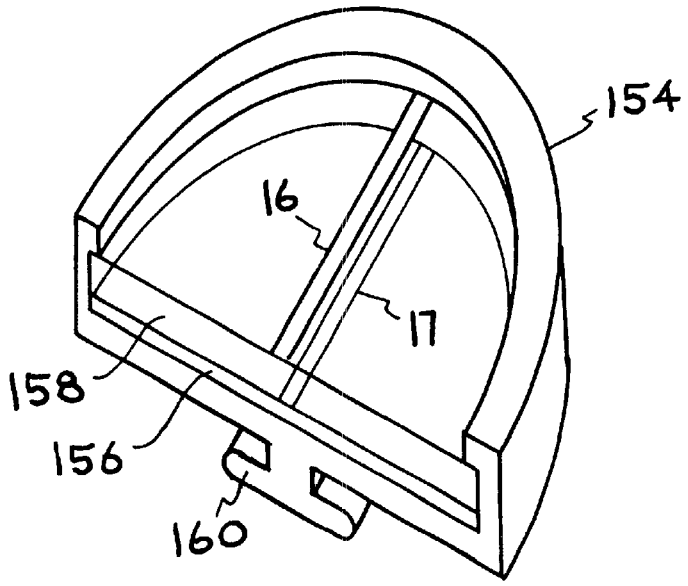
FIG. 15B shows an attachment to the modular embodiment of FIG. 15A.

A modular embodiment of the present invention is shown in FIG. 15A, FIG. 15B shows an attachment to the modular embodiment of FIG. 15A. Front portion 150 of fixed piece 152 is fixedly attached in an existing cavity on the rear side of a putter or chipper head (not shown). Upper portion 154 comprises a reflective surface 156 and a spacer layer 158 with line 16 and reflected line 17. The two pieces are attached by sliding a male portion 160 of upper portion 154 into a female portion 162 located parallel to the plane where parallax has been eliminated by the parallax correction alignment system.

Figure 16:
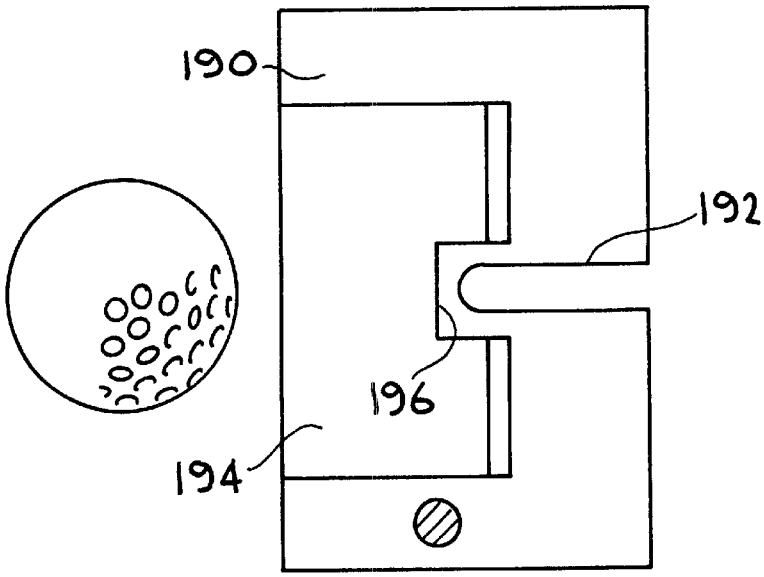
FIG. 16 shows a top view of a putter head with a lower notched portion and an upwardly angled reflective surface that has an upper notch.

FIG. 16 shows a top view of a putter head 190 with a lower notched portion 192 and an upwardly angled reflective surface 194 that has an upper notch 196. In operation, lower notch 192 is aligned within upper notch 196 while viewing the golf ball and the intended target.

Referring to FIGS. 1–4, operation of the device of the present invention requires two different alignment procedures to ensure a true on-axis view of the target. The first alignment procedure is to align the golfer's eye to the proper plane to view an image in the reflective surface 12 by means of the parallax correction alignment system, which in one embodiment contains line 16, reflected line 17, and a transparent space between them. The parallax correction alignment system provides real-time visual feed-back in which the golfer rotates the putter head 10 about the forward axis 22 to eliminate or minimize parallax (i.e., when line 16 overlaps reflected line 17). Alternatively, the golfer may translate his/her eye along horizontal axis 24 until overlap of lines 16 and 17 indicates his/her eye is in the proper viewing plane. The alignment line 16 may incorporate a line or pattern which runs down the center from top to bottom of the transparent spacer layer 18, just above reflective surface 12, and could use different colors for the top and bottom surface of the line or pattern 16. The user views the top surface of the line or pattern 16 and the bottom surface of the line or pattern 17 as it is reflected in the reflective surface 12. When the user's eye is in the proper plane, the line 16 and the reflected line 17 will overlap one another and only the top color will be visible. If the user is not in the proper plane then all or a portion of the reflected line adjacent to either side of the top line be observed, indicating an off-axis or parallax view which exposes a different color on the bottom side.

The second alignment procedure is then to align the club face to the ball and target. This alignment is accomplished by twisting about vertical axis 26 and if necessary, tipping about horizontal axis 24 to observe through reflective surface 12 the golf ball 13 in line with the target. Once this second alignment is accomplished, the user has a view similar to the view of a billiards player viewing the cue stick in alignment with the cue ball and target ball or target direction.

The next step is for the user to iterate alignment procedures one and two to ensure only one line is visible in the reflective surface 12 and also that the club hitting surface, the ball and intended target are in correct sighting alignment. This step is accomplished by the user changing their focus from the parallax alignment system on putter head 10 (in this case line 16), to the images in reflective surface 12, until the user has verified mutual alignment of both alignment steps.

A third independent alignment mentioned above speaks to motion of putter head 10 along horizontal axis 24 to center golf ball 13 on the striking face 20. In a properly balance putter head, the rotational inertia about vertical axis 26 is large enough that no significant amount of rotation of striking face 20 occurs during impact to deflect golf ball 13 in an undesirable way if golf ball 13 is not struck in the middle of the striking surface 20. In other words, this alignment step is very forgiving and not a critical part of lining up a putt. It does, however, have a small effect on the forward energy imparted to the ball. The "sweet spot" on striking face 20 is the impact point which delivers the least angular torque to the golf club. In a proper swing, this spot will be near the center of mass of putter head 10.

Accordingly, it can be seen that proper use of the alignment procedures in conjunction with the alignment system significantly improves the user's ability to accurately align the club face with the intended target. The user will experience an improvement in golf ability and performance because the alignment system provides the user with an on-axis view of club, ball and target which eliminates alignment uncertainties and improves confidence.

The scope of the invention should be determined by the appended claims and their legal equivalents, rather than by the examples given.

We claim:

1. A process for aligning an object in a desired direction, comprising:

aligning a user's view to said object with the help of visual feed-back from a parallax correction alignment system; and aligning said object to said desired direction until said desired direction is viewed in a turning mirror of a sighting alignment system, wherein said object is a golf club comprising a striking face, wherein said parallax correction system comprises a first line and a second line, wherein said first line and said second line are located in a plane defined by the surface normal of said turning mirror and the horizontal component of the surface normal of said striking face of said golf club, wherein said first line is located between a user's view and said second line, wherein said first line and said second line are separated along an optical axis extending from said user's view to said second line, wherein said parallax correction system is aligned when said first line and said second line overlap in said user's view in said plane, wherein said second line is a reflection of said first line from said turning mirror, wherein said second line does not overlap said first line when said user's view is out of said plane, wherein said second line appears at a distance twice the distance between said first line and said turning mirror.

2. The process of claim 1, wherein the step of aligning a user's view includes aligning a user's view to a golf club; and wherein the step of aligning said object includes aligning said object in said desired direction until a golf ball and said desired direction are viewed in a turning mirror of a sighting alignment system.

3. The process of claim 2, wherein the step of aligning a user's view in said desired direction includes aligning a user's view to said object with the help of visual feed-back from a parallax correction system which is aligned when said user's view is in the plane that contains the surface normal of the turning mirror and the horizontal component of the surface normal of the club head striking face.

4. The process of claim 3, wherein the step of aligning a user's view and the step of aligning said object are carried out while said club head striking face is in close proximity to said ball, wherein the step of aligning a user's view to said object and the step of aligning said object to said desired direction are done iteratively.

5. The process of claim 4, further comprising the step of swinging said club away from said ball in a repetitive fashion to verify one can return to said close proximity in proper alignment, thereby developing muscle memory.

6. The process of claim 5, wherein the step of swinging said club includes swinging and aligning said club away from said ball in a receptive fashion at two or more positions along said swing to verify one can return to said close proximity in proper alignment, thereby developing a straight swing.

7. An apparatus for aligning an object in a desired direction, comprising:

a parallax correction alignment system comprising means for defining a plane where parallax has been eliminated; and a sighting alignment system comprising reflecting means having a surface normal located in said plane, wherein said object is a golf club comprising a striking face, wherein said reflecting means comprise a turning mirror, wherein said parallax correction system comprises a first line and a second line, wherein said first line and said second line are located in a plane defined by the surface normal of said turning mirror and the horizontal component of the surface normal of said striking face of said golf club, wherein said first line is located between a user's view and said second line, wherein said first line and said second line are separated along an optical axis extending from said user's view to said second line, wherein said parallax correction system is aligned when said first line and said second line overlap in said user's view in said plane, wherein said second line is a reflection of said first line from said turning mirror, wherein said second line does not overlap said first line when said user's view is out of said plane, wherein said second line appears at a distance twice the distance between said first line and said turning mirror.

8. The apparatus of claim 7, wherein said parallax correction alignment system and said sighting alignment system are selected from a group consisting of a unit that is integral with said object and a modular unit that is fixedly attached to said object, wherein said modular unit is detachable.

9. The apparatus of claim 7, wherein said sighting alignment system further comprises optical elements selected from a group consisting of lenses and holograms to alter the image of said desired direction viewed with said reflecting means, wherein the image plane of the desired direction is moved to another location selected from a group consisting of infinity (where it is easiest for most people to focus) and closer in so the image coincides with said plane where parallax has been eliminated, and wherein the image size of the target is changed in such a way as to adjust the sensitivity of image motion with respect to alignments (such as twisting the club head about a vertical axis through its center of mass).

10. The apparatus of claim 7, wherein said first line and said second line are selected from a group consisting of a dashed line, a dotted line, a segmented line and a textured line, wherein said first line is selected from a group consisting of the same color on its top as on its bottom and a different color on its top than on its bottom wherein said first line contrasts with and is distinguishable from said second line.

[11. The apparatus of claim 7, wherein said parallax correction alignment system further comprises optical elements selected from group consisting of at least one lense and at least one hologram in order to project an image, wherein said at least one hologram comprises about a 2 degree viewing angle, wherein said viewing angle is located within said plane where parallax has been eliminated.]

[12. The apparatus of claim 7, wherein said parallax correction system comprises thin fins parallel to said plane to obscure said user's view from said sighting alignment system when said user's view is out of said plane, wherein said thin fins are above said turning mirror and are embedded in a thin sheet of optically clear material.]

[13. The apparatus of claim 7, wherein said parallax correction system comprises a cylindrical reflector having a surface that is selected from a group consisting of a segmented surface and a continuous surface, said cylindrical reflector having surface normals that are co-planar with said plane, wherein said user's view includes a view of a user's eye when said eye is in said plane.]

[14. The apparatus of claim 7, further comprising means for momentarily blocking said sighting alignment system, said means selected from a group consisting of a mechanical shutter and an electronically controlled liquid crystal light valve with no moving parts.]

[15. The apparatus of claim 7, wherein shapes obscured by fins come into view when said parallax correction alignment system is aligned.]

[16. The apparatus of claim 7, wherein said means for defining said plane where parallax has been eliminated comprises an upper notch located on said reflecting means and a lower notch located in a base portion of said golf club, wherein said plane is defined when a view of said upper notch overlaps said lower notch.]

*17. The apparatus of claim 7, further comprising an optical device, positioned apart from said sighting alignment system, for altering an image viewed in said sighting alignment system.*

*18. A device for aligning a face of a golf club head in a desired direction, said device comprising:*

*a sighting alignment system including a reflective surface, said sighting alignment system coupled to a top portion of said golf club head;*

*means for momentarily blocking said sighting alignment system, comprising a mechanical shutter; and*

*a parallax correction system, positioned apart from said sighting alignment system and defining a plane where parallax has been eliminated; and*

*said reflective surface having a surface normal located in said plane.*

*19. The device of claim 18, wherein said sighting alignment system and said parallax correction system are detachably coupled to said golf club.*

*20. The device of claim 18, further comprising an image correction device positioned apart from said sighting alignment system, for altering an image viewed in said sighting alignment system.*

*21. A device for aligning a face of a golf club head in a desired direction, said device comprising:*

*a sighting alignment system including a reflective surface, said sighting alignment system coupled to a top portion of said golf club head;*

*means for momentarily blocking said sighting alignment system; and*

*a parallax correction system, positioned apart from said sighting alignment system and defining a plane where parallax has been eliminated; and*

*said reflective surface having a surface normal located in said plane; and*

*wherein said means for momentarily blocking said sighting alignment system is an electronically controlled liquid crystal light valve with no moving parts.*

* * * * *